W. H. OLDHAM.
AIR CONTROLLER FOR EXPLOSIVE ENGINES.
APPLICATION FILED FEB. 6, 1915.

1,171,457.

Patented Feb. 15, 1916.

W. H. Oldham
Inventor

Witnesses
by C. A. Snow & Co.
Attorneys

UNITED STATES PATENT OFFICE.

WILLIAM H. OLDHAM, OF ELKTON, KENTUCKY.

AIR-CONTROLLER FOR EXPLOSIVE-ENGINES.

1,171,457. Specification of Letters Patent. Patented Feb. 15, 1916.

Application filed February 6, 1915. Serial No. 6,521.

*To all whom it may concern:*

Be it known that I, WILLIAM H. OLDHAM, a citizen of the United States, residing at Elkton, in the county of Todd and State of Kentucky, have invented a new and useful Air-Controller for Explosion-Engines, of which the following is a specification.

The present invention relates to improvements in air controllers for explosion engines, one object of the invention, being the provision of means controlled by the spark advancing and throttle controlling members of an explosion engine, and more particularly of that type used in connection with automobiles, whereby an air valve for controlling the supply of air to the carbureter is adjusted and controlled by the coaction of the spark advancing member and the throttle control device, thus permitting the air supply to be reduced when the spark is not advanced at the initial starting of the engine, permitting the valve to be so positioned or advanced when the spark is advanced, that the simple manipulation of the throttle controlling member will increase or decrease the supply of air in proportion to the supply of fuel, and thus not at all times permitting the same flow of air regardless of the amount of fuel supplied.

A further object of the present invention, is the provision of a novel arrangement of such mechanism whereby the same may be readily attached to automobiles now in use for controlling the supply of air to the carbureter, the present device being adapted to be placed out of sight and to be operably connected to the two controlling members, that is the spark controlling member and the throttle controlling member, and thus in ready access to the operator from the seat of the automobile.

A still further object of the invention, is the provision of a device of this character, which is simple, inexpensive and durable in construction, and which is therefore thoroughly efficient and practical in use.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

Figure 1:
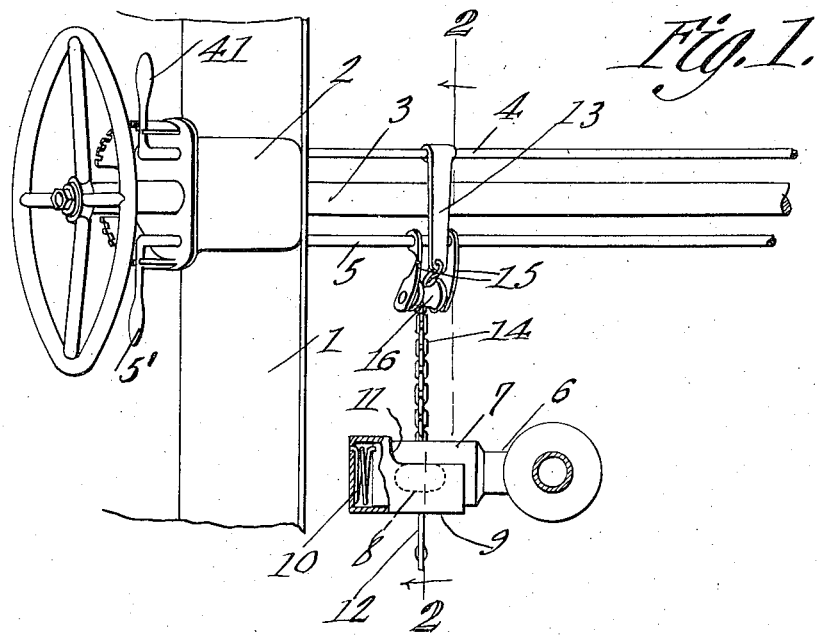
Figure 2:
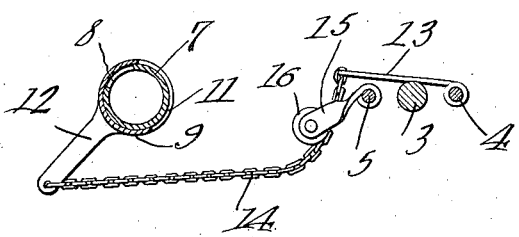
Figure 3:
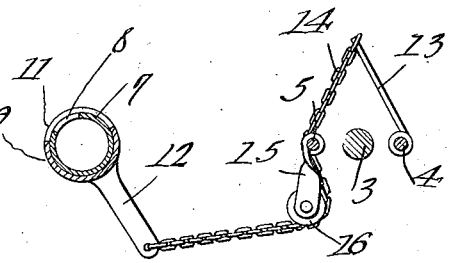

In the drawings—Figure 1 is a diagrammatic top plan view of a portion of a dash board showing the steering mechanism and the spark controlling and throttle controlling members with the present invention applied thereto. Fig. 2 is a section taken on line 2—2 of Fig. 1 showing the parts in the position they assume when the spark is not advanced. Fig. 3 is a similar view showing the parts in the position they assume with the spark advanced and with the throttle operating member actuated to open the valve.

Referring to the drawings, the numeral 1 designates the dash board of an automobile which carries the supporting casing 2 for the steering shaft 3, the spark controlling rod 4 and the throttle controlling rod 5, said rods 4 and 5 being provided with the manipulating handles 41, and 5' which may be taken indicative of any form of means for oscillating such rods 4 and 5.

The air admitting manifold 6, is so disposed as to supply air to the carbureter, or if so desired direct it to the intake manifold of an explosion engine (not shown). One end of the manifold or conduit 6 is provided with the cylindrical sealed head 7, provided with the side port 8, while disposed for oscillation thereupon is the cylindrical cap shaped valve member 9 which is held normally in closed position by means of the spiral spring 10, which is interposed between the inner head 10 thereof and the outer end of the head 7. The valve 9 is provided with the port 11 which under normal conditions, with the spark controlling rod 4 in normal position, assumes the position as shown in Fig. 2, said port 11 being out of registration with the port 8.

The valve is provided with the operating arm or member 12, which is connected to the adjusting arm or member 13 which in turn is fixed upon the spark controlling rod 4 by means of a chain or other flexible connection 14. Thus, it will be seen that as the rod 4 is oscillated from the position as shown in Fig. 2 to that shown in Fig. 3, that the chain or flexible connection 14 will be pulled upon and will, through the arm 12 oscillate the valve so as to cause the port 11 thereof to be brought in closer proximity to the port 8 of the member 7.

In order to provide a means to increase or decrease the supply of air through the pipe 8 and in consonance with the actuation of the throttle controlling rod 5, there is attached to the rod 5, the two parallel arms 15, which have journaled therebetween, the pulley 16. This pulley 16 is so disposed as to permit the chain 14 to pass between the arms 15 and consequently the pulley rests above the flexible connection or chain 14 so that when the shaft 5 is moved from the position as shown in Fig. 2, to that shown in Fig. 3, the chain will be pulled upon and as the arm 13 is stationary and thus maintains that end of the chain fast, the lever 15 will be moved and thus oscillates the valve 9 to place the port 11 in registration with the port 8, the latitude of opening being governed entirely by the distance or latitude of movement of the shaft 5. Thus the more the throttle is opened and actuated by the rod 5, the greater the opening permitting of the valve members 7 and 9 and consequently a greater inrush of air through the pipe 6 to the inrushing fuel or the carbureted air entering the intake manifold of the engine. By this mechanism, it is evident that in starting the engine, that the air valve will be closed entirely for the reason that the parts will assume the position as shown in Fig. 2, with the spark controlling rod not advanced, thus preventing any danger of a back fire when cranking the engine, and also permitting a rich mixture of the fuel to enter the engine at the initial starting thereof. After the engine has been initially started, the rod 4 is manipulated through its handle 41 to elevate the arm 13 to any one of the intermediate positions from that shown in Fig. 2 to that shown in Fig. 3, which in turn pulls upon the arm 12 and moves the port 11 of the valve 9 to a point near registration with the port 8 or in an overlapped relation thereto so that air is permitted to flow through the ports 11 and 8 into the pipe 6 due to the suction of the engine. Thus with the spark properly advanced, the parts assume approximately the position as shown in Fig. 3 so that the oscillation of the throttle controlling rod 5 through the handle 5' will cause the valve to be operated in opposition to the spring 10 and thus permit the fuller opening out between the ports 8 and 11 and consequently a greater inrush of air through the pipe 6. It will thus be seen that the control of air to make the explosive mixture is automatically brought into play by means of the manipulation of the spark advancing or controlling member 4 and the throttle controlling member 5.

Although it is apparent that the present device may be used to control the supply of air to the carbureter, it is primarily adapted for use for connection to the manifold beyond the carbureter so as to mix with the carbureted air after its mixture in the carbureter, thus providing means for producing an accelerating supply of air under varying load conditions.

It is to be understood that the present device can be used to work an air valve anywhere along the intake channel or manifold. Even the valve in the carbureter may be operated.

What is claimed is:

1. The combination with an air controlling valve and spark and throttle controlling devices of an explosion engine, of means operatively connecting said devices and valve and operating to open the valve when both of said devices are advanced.

2. The combination of an air controlling valve and oscillatory spark and throttle controlling rods, of an operative connection between said rods and valve and operating to open said valve when both of said rods are advanced.

3. The combination with a normally closed air intake valve and spark and throttle controlling devices of an explosion engine, of an arm carried by the spark controlling device, a flexible element connecting said arm and valve, and means carried by the throttle controlling device for engaging said flexible element, said arm, flexible element and means operating to open the valve when both of said devices are advanced.

4. The combination with a normally closed air intake valve and throttle and spark controlling rods of an explosion engine, of an arm carried by the spark controlling rod, a flexible element connecting said arm and valve, and a member carried by the throttle controlling rod and engaging said flexible element to open the valve.

5. The combination with a spring closed air intake valve and throttle and spark controlling rods of an explosion engine, of an arm attached to the spark controlling rod, a flexible element connecting said arm and valve, and an arm carried by the throttle controlling rod and having a roller engaging said flexible element.

In testimony that I claim the foregoing as my own, I have hereto affixed my signature in the presence of two witnesses.

WILLIAM H. OLDHAM.

Witnesses:
W. R. WOOD,
JNO. O. STREET.